W. F. MAYER.
ROTARY PUMP OR MOTOR.
APPLICATION FILED NOV. 12, 1919.

1,398,788.

Patented Nov. 29, 1921.

INVENTOR.
Waldemar F. Mayer
BY
Jas. F. Richmond
ATTORNEY.

UNITED STATES PATENT OFFICE.

WALDEMAR F. MAYER, OF PHILADELPHIA, PENNSYLVANIA, ASSIGNOR TO TAYLOR-WHARTON IRON AND STEEL COMPANY, OF HIGH BRIDGE, NEW JERSEY, A CORPORATION OF NEW JERSEY.

ROTARY PUMP OR MOTOR.

1,398,788. Specification of Letters Patent. Patented Nov. 29, 1921.

Application filed November 12, 1919. Serial No. 337,420.

*To all whom it may concern:*

Be it known that I, WALDEMAR F. MAYER, a citizen of Switzerland, residing at Philadelphia, in the county of Philadelphia and State of Pennsylvania, have invented certain new and useful Improvements in Rotary Pumps or Motors, of which the following is a specification.

This invention relates to an improvement in fluid transmissions, wherein a correct relative position of the pistons and eccentric is maintained by centrifugal force; there is no side thrust on the pistons; and automatic forced lubrication of all working parts is obtained.

The invention is illustrated in e accompanying drawings, in which:—

Figure 1:
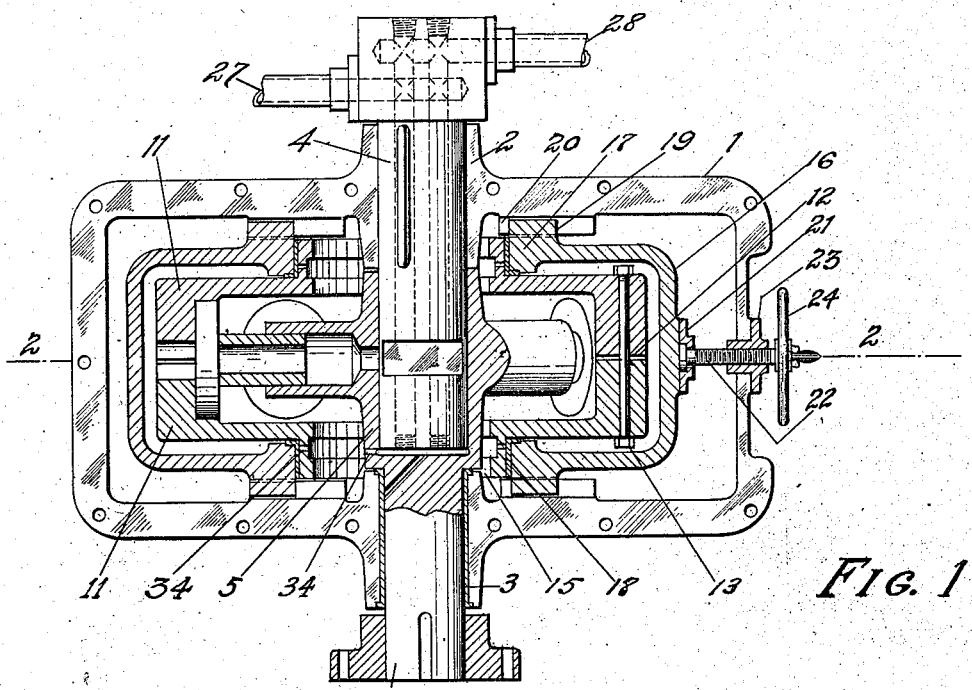
Figure 1 is a view in section of the improved fluid transmission.
Figure 2:
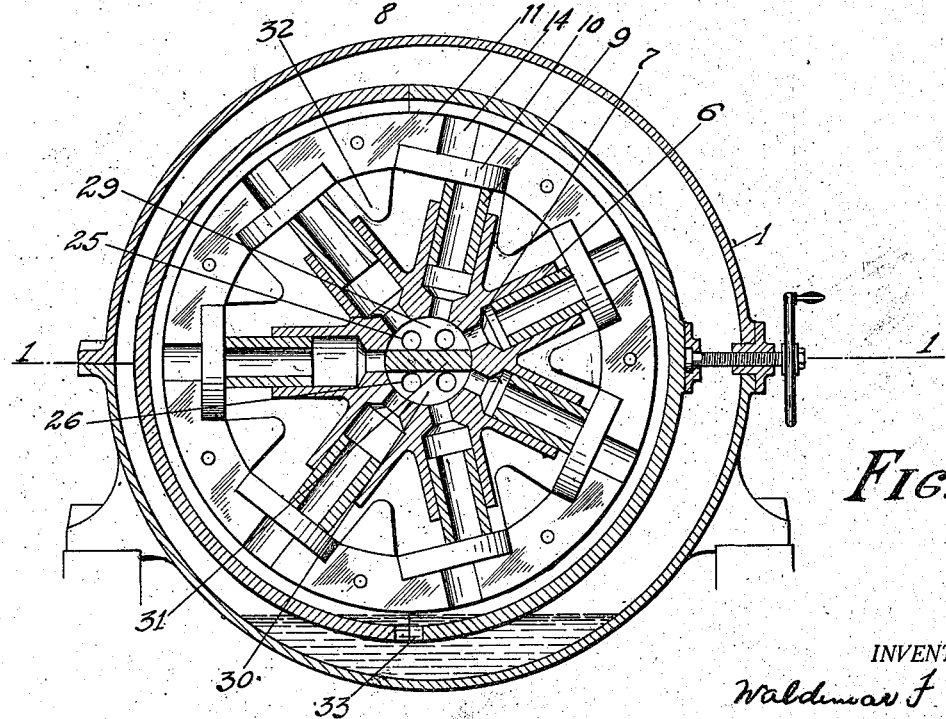
Fig. 2 is a section of the same on the line 2—2 of Fig. 1.

The improved fluid transmission comprises a housing 1 formed in two sections, and having center bearing openings 2 and 3. A valve 4 is arranged in one center bearing, as 2, and keyed to the housing, so that the valve is fixed relative to the casing.

A cylinder carrying body 5 is rotatably mounted on the valve, and formed to provide radial cylinders 6, having ports 7. The body 5 has a shaft extension 8 mounted in the opening 3 of the housing, and freely rotatable therein. Hollow pistons 9 work in the cylinders 6, the open outer ends of these pistons being closed in operation by disks 10, seated in appropriately formed recesses in the adjustable split ring 11. This ring is formed in two sections, each of substantial cup form, with the respective edge flanges in contact, except for a restricted opening 12 therebetween. Bolts 13 secure the sections of the ring in ring formation, and the recesses for the disks 10 are formed in the circumferential rim thus provided. If desired such rim may be formed with openings 14 therethrough to permit accurate finishing of the seats for the disks.

The split ring 11 is formed with center line openings 15 to encircle the valve, the openings being materially larger than the diameter of the valve to permit of the adjustment of the ring for eccentricity. An adjusting ring 16, preferably in closely connected sections, is formed with center line openings, the walls of which are enlarged to form bearings 17, for the bearing extensions 18 of the split ring. The adjusting ring has end lugs 19, mounted to slide in guideways 20 on the inner surface of the housing, the arrangement of the guideways admitting of diametric movement but precluding rotative movement of the adjusting ring. A bracket 21 is secured to the adjusting ring, revolubly supporting an adjusting screw 22, having threaded engagement with a bushing 23 in the housing. The screw 22 has suitable operating means 24 beyond the housing.

The valve 4 is formed with longitudinally-extending channels 25 and 26, communicating at the outer end of the valve with pipe connections 27 and 28. The valve in line with the cylinder ports 7, has diametrically-opposed chambers 29 and 30 formed, with an intervening partition 31. The chambers communicate with the respective channels in the valve to establish the necessary communication with the cylinders through the ports 7, as will be understood without further explanation.

The sections of the split ring may be provided with lugs 32, for imparting rotation to said ring in the starting of the transmission from rest. As soon as the motion is such as to generate the centrifugal force necessary to hold the pistons against the disks 10, the relative positions of the cylinder body and split rings will be automatically assumed and maintained.

The shaft extension 8 of the cylinder body is to be positively driven in any suitable manner, and in operation following the adjustment of the split ring by means of the adjusting ring, to secure the desired eccentricity, the pistons are reciprocated for the pumping action. The outer ends of the pistons are closed by being held against the disks 10 largely through the centrifugal force developed by the rotative action of the parts.

The split-ring sections are held slightly separated, as previously described, to thereby permit an oil leakage into the adjusting ring. The adjusting ring is formed in its lower portion with an opening 33, to permit escape of leakage oil to the housing, where it is collected. The various bearings have openings or oil ducts leading thereto, as indicated at 34. The bearings will be subject to automatic forced lubrication during operation, as the centrifugal force will compel the leakage to find its way to the bearings. A slight leakage will occur between the disks 10 and the ends of the pistons. This not only insures perfect lubrication here, but provides an opportunity to expel the air from the motive fluid. The leakage oil collecting in the housing, as described, will be drawn back into the system by the action of the pump as needed.

Disregarding the friction between the disks 10 and the pistons, there is no side thrust on the pistons, and hence wear incident to side thrust is avoided.

Having thus described my invention, what I claim as new is:—

1. A fluid transmission, including a housing, a cylinder body rotatable therein, hollow pistons operatable in the cylinders, a stroke impelling ring provided with disks to provide piston closures under centrifugal force, said ring being formed to permit a leakage passage, and means for adjusting the rotative axis of the ring relative to that of the body.

2. A fluid transmission, including a housing, a cylinder body rotatable therein, hollow pistons operatable in the cylinders, a stroke impelling ring provided with disks constituting piston closures under centrifugal force, means for effecting forced lubrication, and means for adjusting the ring.

3. A fluid transmission, including a housing, a cylinder body mounted for rotation therein, pistons operatable in the cylinders, a stroke impelling ring, means for utilizing leakage for effecting forced lubrication, and means for adjusting the ring.

4. A fluid transmission comprising a housing, a cylinder body rotatable therein, a valve in the housing on which said body is rotatably mounted, hollow pistons operating in said cylinders, a stroke impelling ring encircling the body, disks secured in said ring to form closures for the pistons under the developed centrifugal force, an adjusting ring in which the impelling ring is rotatably mounted, means for adjusting said ring to change the rotative axis of the impelling ring relative to the body, the impelling ring permitting leakage therebeyond, and a collection reservoir in the housing for such leakage and from which fluid may be restored to the system.

In testimony whereof I affix my signature.

WALDEMAR F. MAYER.